UNITED STATES PATENT OFFICE 2,377,105

DERIVATIVE OF α,γ-DIHYDROXY-β,β-DIMETHYL-BUTYRIC ACID AND PROCESS FOR THE MANUFACTURE OF SAME

Tadeus Reichstein, Basel, Switzerland, assignor to Hoffmann-La Roche Inc., Nutley, N. J., a corporation of New Jersey No Drawing. Application May 29, 1944, Serial No. 537,978. In Switzerland September 6, 1943

4 Claims. (Cl. 260—561)

It has been found that a new derivative of d(—)-α,γ-dihydroxy-β,β-dimethyl-butyric acid can be obtained if 3,4-dihydroxy-butylamine or dimethyl-methylene-3,4-dihydroxy-butylamine is caused to act on α-hydroxy-β,β-dimethyl-γ-butyric-acid-lactone. In the latter case, the resulting condensation product must be subjected to a gentle, acid hydrolysis. This reaction proceeds according to the following formulae:

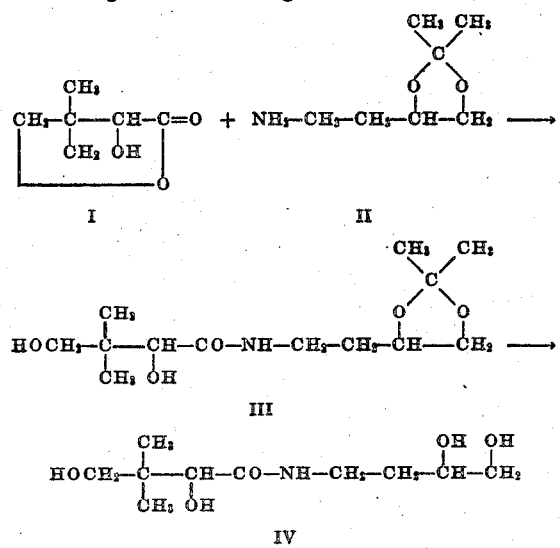

In this reaction it is surprising that it is possible to split off the acetone radical from the condensation product without destroying the amide-linkage, because pantothenic acid as well as the hydroxy-alkyl-amides of α,γ-dihydroxy-β,β-dimethyl-butyric acid are extraordinarily easily saponifiable in comparison with other acid amides. The optical acitvity is not influenced by the hydrolysis.

The 3,4-(dimethyl-methylene-dihydroxy)-butylamine (II) needed as starting material can be prepared in the following manner: delta-hydroxy-γ-valeric-acid-lactone (Leuchs and collaborators, "Berichte der Deutschen Chemischen Gesellschaft," vol. 40, year 1907, page 301; vol. 42, year 1909, page 1228; Winterfield, "Archiv der Pharmazie," vol. 277, year 1939, page 227) is transformed into the 4,5-dihydroxy-valeric-acid-amide by standing for 2 days in 6 times the quantity of methanol saturated at 0° C. with dry NH₃. The said 4,5-dihydroxy-valeric-acid-amide, obtained as a colourless, viscous oil, is thereupon dissolved in about 100 parts by weight of dry acetone. Then a little dry hydrochloric acid gas is introduced until the solution just reacts acid to Congo paper. After standing for one day, it is shaken with a little solid potassium carbonate, filtered and evaporated. The residual 3,4-(dimethyl-methylene-dihydroxy)-valeric-acid-amide can be distilled in vacuo at 0.1 mm. under 125° C. and crystallised from acetone-ether in small colorless plates of melting point 92° C. The decomposition of this amide in accordance with Hofmann yields the required base (II), which boils in a vacuum of 11 mm. at 74-75° C. as a very mobile, colorless liquid and which easily absorbs $CO_2$ as well as water from the air. It yields a picrate melting at 157-158° C.

For condensation purposes, the 3,4-(dimethyl-methylene-dihydroxy)-butylamine is reacted with the equimolecular quantity of d(—)-α-hydroxy-β,β-dimethyl-γ-butyrolactone, preferably in an indifferent solvent in which both components are soluble. The reaction already occurs at room temperature after about 24 hours and can be accelerated by heating. The 3,4-(dimethyl-methylene-dihydroxy)-butylamide of α,γ-dihyoxy-β,β-dimethyl-butyric acid thus obtained forms a colorless oil which can be distilled in high vacuo without decomposition. Under a pressure of 0.1 mm., the compound distills at a bath-temperature of about 130° C.

α,γ-Dihydroxy-β,β-dimethyl-butyric-acid-3',4'-(dimethyl-methylene-dihydroxy)-butylamine (III), when subjected to a mild, acid hydrolysis, yields 3,4-dihydroxy-butylamide of d-α,γ-dihydroxy-β,β-dimethyl-butyric acid (IV) as a colorless, hygroscopic, very viscous and easily water-soluble oil, which, even in vacuo, cannot be distilled without decomposition. Its analytical figures correspond to the formula $C_{10}H_{21}O_5N$.

Example 1

A solution of 10.5 parts by weight of 3,4-dihydroxy-butylamine in 20 parts by volume of methanol, prepared under exclusion of water and carbon-dioxide, is treated with 13 parts by weight of dry d(—)-α-hydroxy-β,β-dimethyl-γ-butyric-acid-lactone, which readily goes into solution. The mixture is then allowed to stand for 24 hours in a closed receptacle or boiled under reflux for one hour. The methyl-alcohol is thereupon distilled off and the residue dried in high vacuo at 120° C. The d(+)-α,γ-dihydroxy-β,β-dimethyl-butyric-acid-3',4'-dihydroxy-butylamide thus obtained in almost theoretical yield is a viscous, nearly colorless oil readily soluble in water.

Example 2

2 parts by weight of d,l-dimethyl-methylene-3,4-dihydroxy-butylamine and 1.7 parts by weight of d(—)-α-hydroxy-β,β-dimethyl-γ-butyric-acid-lactone are dissolved in 12 parts by weight of anhydrous benzene and the solution boiled under reflux for one hour under exclusion of moisture. The solution is then evaporated to dryness in vacuo.

For the subsequent working up, a further purification is not necessary, although it is possible to distill the compound at a pressure of 0.1 mm. When analysing the distillation product, figures corresponding to the theory are obtained for carbon, hydrogen and nitrogen.

7 parts by weight of the crude condensation product are dissolved in 50 parts by volume of n/10 sulfuric acid and left to stand at 18° C. By determination of the split-off acetone it can be proved that under these conditions the saponification has come to an end after 30 minutes. The solution is neutralised by means of stirring in an excess of freshly precipitated barium-carbonate and passed through a suction filter covered with a layer of barium-carbonate and a little charcoal previously extracted with water. The filtrate contains the required d(+)-2,4-dihydroxy-3,3-dimethyl-butyric-acid-(3',4'-dihydroxy-butyl)-amide, which remains behind in vacuo upon concentration of the solution.

I claim:

1. A derivative of α,γ-dihydoxy-β,β-dimethyl-butyric acid, consisting of d(+)-2,4-dihydroxy-3,3-dimethyl-butyric-acid - (3',4'-dihydroxy - butyl) amide.

2. Process for the manufacture of a derivative of α,γ-dihydroxy-β,β-dimethyl-butyric acid, comprising condensing d(—)-α-hydroxy-β,β-dimethyl-γ-butyric-acid-lactone with a substance selected from the group consisting of 3,4-dihydroxy-butylamine and the dimethyl-methylene derivative thereof.

3. Process for the manufacture of a derivative of α,γ-dihydroxy-β,β-dimethyl-butyric acid, comprising condensing d(—)-α-hydroxy-β,β-dimethyl-γ-butyric-acid-lactone with 3,4-dihydroxy-butylamine in the presence of a solvent.

4. Process for the manufacture of a derivative of α,γ-dihydroxy-β,β-dimethyl-butyric acid, comprising condensing d(—)-α-hydroxy-β,β-dimethyl-γ-butyric - acid - lactone with d,l - dimethyl-methylene-3,4-dihydroxy - butylamine and subjecting the condensation product obtained to a mild, acid hydrolysis.

TADEUS REICHSTEIN.